(12) United States Patent
Astle et al.

(10) Patent No.: US 6,396,816 B1
(45) Date of Patent: May 28, 2002

(54) METHOD AND APPARATUS FOR MULTIPLE APPLICATIONS ON A SINGLE ISDN LINE

(75) Inventors: Brian Astle; William Pohlman, both of Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 08/360,972

(22) Filed: Dec. 20, 1994

(51) Int. Cl.[7] .............................. H04J 3/02; H04L 12/18
(52) U.S. Cl. ...................... 370/264; 370/419; 370/421; 370/462; 370/463; 370/468; 348/14.09; 379/202.01
(58) Field of Search ................................ 370/85.6, 94.1, 370/13, 79, 118, 110.1, 62, 60, 263–266, 419–421, 485–487, 462, 463, 468, 477, 522, 524; 348/384, 17, 423, 462, 467, 14, 15, 14.08–14.09, 423.1; 379/202, 202.01–205.01; 375/240

(56) References Cited

U.S. PATENT DOCUMENTS

| | | | | |
|---|---|---|---|---|
| 4,965,798 A | * | 10/1990 | Mostaja et al. | 370/79 |
| 5,132,966 A | * | 7/1992 | Hayano et al. | 370/79 |
| 5,231,631 A | * | 7/1993 | Buhrke et al. | 370/60 |
| 5,367,517 A | * | 11/1994 | Cidon et al. | 370/79 |
| 5,392,223 A | * | 2/1995 | Caci | 348/17 |

* cited by examiner

Primary Examiner—Seema S. Rao
(74) Attorney, Agent, or Firm—Blakely, Sokoloff, Taylor & Zafman LLP

(57) ABSTRACT

A method and apparatus for providing multiple interactive video teleconferencing sessions over a standard ISDN line is described. Multiple sets of audio, video, and data information are generated and transmitted to a bandwidth allocation device which determines what portion of that information will be transmitted over the ISDN line. Additionally, priority request values are generated that assist the bandwidth allocation device in performing its allocation function such that users interacting with the audio, video and data generation sources will experience acceptable levels of interaction even when bandwidth demand is greater than the supply.

39 Claims, 8 Drawing Sheets

METHOD AND APPARATUS FOR MULTIPLE APPLICATIONS ON A SINGLE ISDN LINE

BACKGROUND OF THE INVENTION

1. Field of the Invention

The present invention relates to the field of digital communications. More particularly, the present invention relates to a digital communication system and method for efficiently transferring digital information between multiple terminals over a single channel communication link.

2. Background Art Related to the Invention

In anticipation of the increased need to transmit digital information rapidly across a substantial distance, the telephone industry has developed a digital communication link which enables a twisted pair of copper lines to transfer a substantial amount of digital information from one terminal to another with only minimal modification of prior installed telephone hardware. This digital communication link is referred to as an Integrated Services Digital Network ("ISDN") which is well known in the art and defined by International Telegraph and Telephone Consultative Committee ("CCITT"). In recent years, the telephone industry has begun to utilize a sub-category of ISDN; namely, a Narrow-band Integrated Services Digital Network ("N-ISDN") which partitions data into several channels. A further sub-category, well-known but still in development, is a Broad-band ISDN ("B-ISDN") which partitions data into even more channels than N-ISDN.

Referring to FIG. 1, a conventional N-ISDN system 100 generally is configured with a terminal coupled at one end of a dedicated ISDN communication link and a remote terminal coupled to the other end of the ISDN communication link. A "terminal" represents either a device (e.g., a computer, facsimile machine, digital telephone, etc.) which produces at least one digital data stream at sixty-four (64) kilobits per second ("ISDN terminal") or a "non-ISDN terminal" being any other device with a serial RS-232 port. As shown, a non-ISDN terminal 105, more specifically its serial port 110, is coupled to a terminal adapter 115 through a coaxial cable line 120. The terminal adapter 115 enables older generation terminals to be compatible with ISDN protocols. It is contemplated that the terminal adapter 115 may be employed within the terminal 105 or externally as shown.

The terminal adapter 115 is coupled to an interface connector 125 through a bi-directional digital line 126. The interface connector 125 is coupled between the bi-directional digital line 126 and a corresponding dedicated, pre-configured ISDN communication link 130. If the ISDN communication link 130 is a N-ISDN communication link, the interface connector 125 is configured as a "basic rate interface" being well known in the art for supporting digital transmissions of up to 192 kilobits per second ("kb/s") with framing bits. A typical embodiment of the basic rate interface provides two bi-directional, sixty-four (64) kb/s information channels and one bi-directional sixteen (16) kb/s control channel. In addition to these three channels, other supplemental channels may be available, for example, a twelve (12) kb/s channel for framing/timing and a four (4) kb/s channel for overhead to support network operations. It is further contemplated that the interface connector 125 may be configured as a "primary rate interface" if the ISDN communication link 130 is a B-ISDN communication link.

The ISDN communication link 130 is coupled to a second terminal adapter 135 remotely located from the terminal 105. The second terminal adapter 135 also is coupled to a remote terminal 140. As a result, the conventional N-ISDN system enables the terminal 105 to transmit information to and receive information from the remote terminal 140. However, there are several disadvantages associated with this conventional ISDN system.

One disadvantage is that conventional ISDN systems do not efficiently utilize available bandwidth. For example, bit streams containing information crucial in maintaining acceptable communications between terminals are not given greater priority than other transmissions. Another example is that conventional ISDN systems utilize two fixed bandwidth channels to support digital transmissions. In the event that a specific terminal is not using a substantial portion of bandwidth provided in one or both of these channels, a likely situation since different amounts of bandwidth may be required for different compression needs, certain transmissions and/or operations may be delayed or precluded.

Yet another disadvantage is that multiple ISDN communication links and interface connectors are required to support multiple terminals. The additional costs associated with these connectors and ISDN communication links effect the general affordability of the conventional ISDN system.

Hence, it is desirable to provide a method and apparatus for supporting communications through a single connector over a single channel communication link (preferably an ISDN link) in order to reduce additional costs associated with multiple interface connectors. It is further desirable to configure the apparatus and method to efficiently allocate available bandwidth of the ISDN communication link to support real-time, interactive communications.

BRIEF SUMMARY OF THE INVENTION

A method and apparatus for providing digital information in a multiple interactive environment over a single communication link is described. Information, such as audio, control data and video, is generated by at least one terminal and is transmitted from the terminal to a resource allocation device. The resource allocation device (i) determines what portion of that information will be transmitted over the communication link, (ii) constructs information packets according to the allocated bandwidth and (iii) controls the multiplexing of the information packets.

BRIEF DESCRIPTION OF THE DRAWINGS

The features and advantages of the present invention will become apparent from the following detailed description of the present invention in which.

DETAILED DESCRIPTION OF THE INVENTION

An apparatus and method for supporting interactive communication over a single ISDN line is described in detail. In the following description for purposes of explanation, specific details are set forth to provide a thorough understanding of the present invention. However, the present invention may be practiced by a person skilled in the art of digital communications without these specific details. In other instances, well known structures, devices, and configurations are not shown in order to avoid unnecessary obscuring of the present invention. It is contemplated that various elements forming the present invention can be practiced through hardware or software encoded mechanisms.

Figure 1:
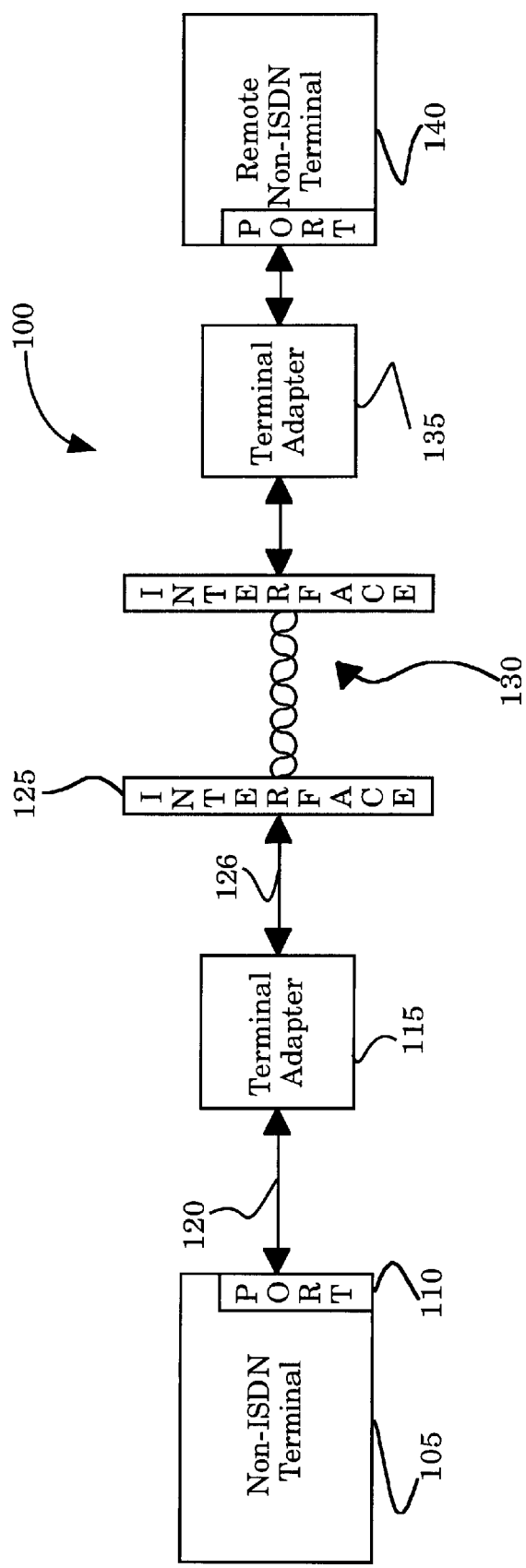
FIG. 1 is a block diagram of a conventional N-ISDN system enabling a terminal located at one end of a N-ISDN communication link to transmit and receive digital information from a remote terminal located at the other end of the N-ISDN communication link.
Figure 2:
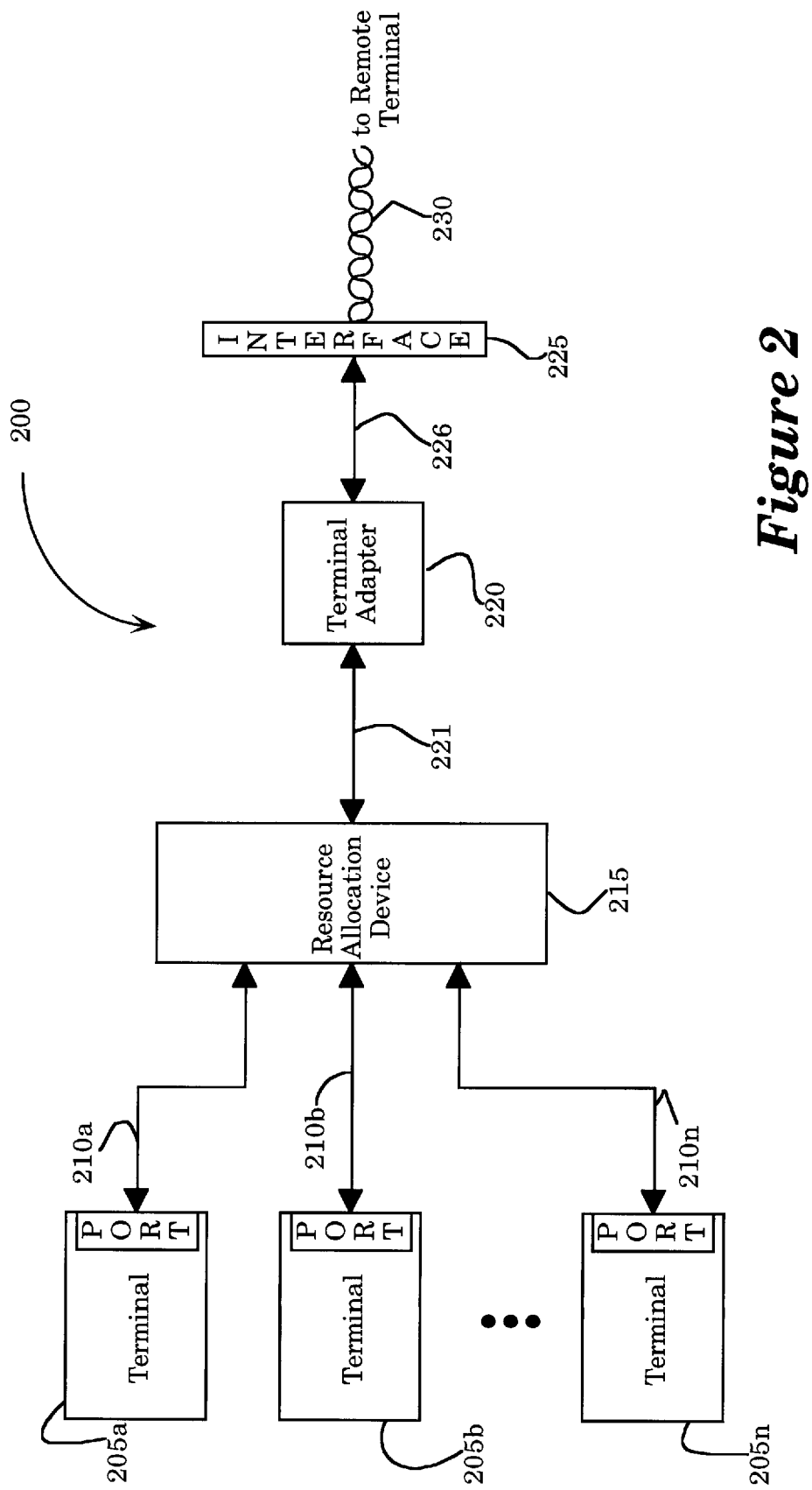
FIG. 2 is a block diagram of one embodiment of an digital communication system employing a resource allocation device coupled to a single connector to allocate available bandwidth of the ISDN communication link to multiple terminals.

Referring to FIG. 2, an illustrative embodiment of a digital communication system 200 employing the present invention is shown. The digital communication system 200 comprises at least one terminal and preferably a plurality of terminals 205a–205n ("n" being arbitrary) such as non-ISDN terminals. Each of these plurality of terminals 205a–205n bi-directionally communicates with a resource allocation device 215 through a corresponding plurality of bi-directional information bus lines 210a–210n, respectively. Each of these bi-directional information bus lines 210a–210n represent a Public Switched Telephone Network ("PSTN") line or a number of bus lines dedicated to any type of digital information (e.g., audio, control data including text, video, images, files, etc.) provided by its associated terminal. It is contemplated, however, that ISDN terminals may be employed in lieu of some or all of the non-ISDN terminals 205a–205n accompanied by removal of a corresponding terminal adapter (discussed below).

Upon receiving uncompressed, digital information from at least one of the terminals 205a–205n, the resource allocation device 215, coupled to a single terminal adapter 220 through a bi-directional information line 221, encodes the digital information and transmits the encoded digital information to the terminal adapter 220. In turn, the terminal adapter 220 prepares the encoded digital information according to ISDN protocol and transfers the same to an interface connector 225 through a bi-directional information line 226. The interface connector 225 functions as an interface for a single ISDN communication link 230 (i.e., a "basic rate" interface if the ISDN communication link 230 is an N-ISDN communication link or a "primary rate" interface if the ISDN communication link 230 is a B-ISDN communication link), so that digital information transmitted into the interface connector 225 propagates through the ISDN communication link 230. From there, the digital information is appropriately dispersed to a designated remote terminal (not shown).

Preferably, the terminals 205a–205n concurrently transmit digital information to the resource allocation device 215. Such digital information includes, but not limited to, allocation control, audio, control data, video or any other type of information. In general, allocation control information indicates (i) an amount of bandwidth requested by a particular terminal for a given type of digital information (e.g., audio, control data, video, etc.) and (ii) the priority of the terminal being afforded the amount of bandwidth. Based on this allocation control information and the total bandwidth available, the resource allocation device 215 determines how much bandwidth is allocated to each of the plurality of terminals 205a–205n. Thereafter, the resource allocation device 215 constructs information packets (defined as a plurality of information bits) in accordance with the amount of bandwidth allocated and transmits these packets for propagation over the ISDN communication link 230.

Figure 3:
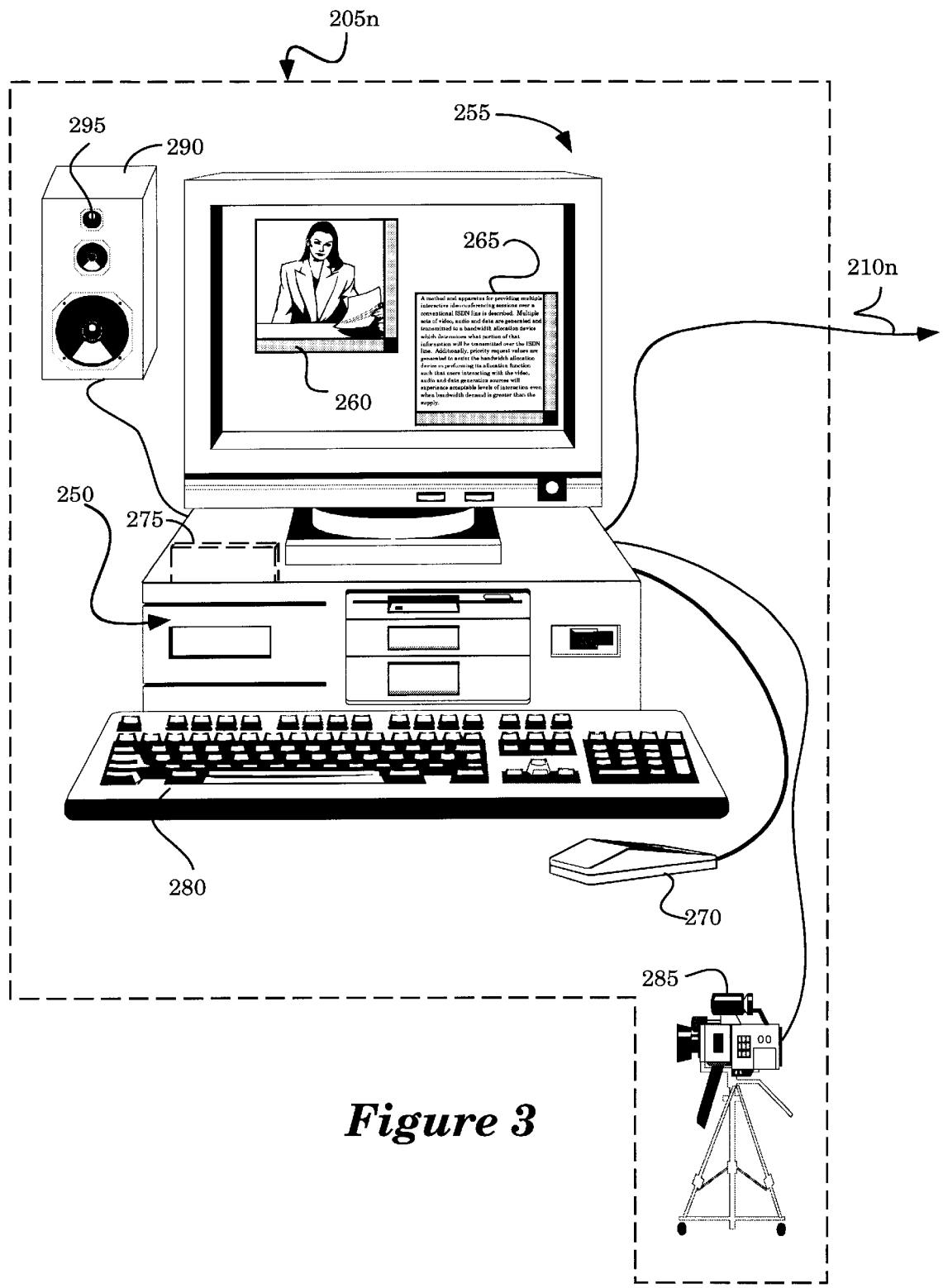
FIG. 3 is a block diagram of an illustrative embodiment of a terminal of the digital communication system of FIG. 2.

Referring now to FIG. 3, an illustrative embodiment of one of the terminals, for example, terminal 205n of FIG. 2 is shown. The terminal 205n is able to interactively transmit and display a number of digital information types. For clarity sake, these digital information types include audio, control data and video, although it is contemplated that other digital information types such as allocation control, images and files may be transmitted and received by the terminal 205n. The terminal 205n includes a computer system 250 being controlled by any operating environment (e.g., Windows™) for processing digital information and a monitor 255 for displaying video images and control data. As shown, the monitor 255 displays a first display window 260 for illustrating a video image generated by and transmitted from a remote terminal (not shown) and a second display window 265 for illustrating control data (e.g., alpha-numeric character strings) generated by and transmitted from the remote terminal.

A number of peripherals are coupled to the computer system 250 to generate information (e.g., audio and video) for transmission to a remote terminal as well as to decode information from remote terminals. One of these peripheral devices includes a cursor control device 270 being a mouse, trackball, touch pad and the like. The cursor control device 270 is used for control purposes. In addition, a video decoder 275, based on software or being a printed circuit board as illustrated, operates on a compressed video bit stream from the remote terminal in order to produce a displayable video sequence. Other peripherals enable the terminal 205n to input digital information into the digital communication system.

More specifically, control data can be input into the digital communication system through an alpha-numeric keyboard 280. Video, on the other hand, is input into the digital communication system through a camera 285 which generates a video image of the user or other objects. A speaker 290 provides audio to the user from the remote terminal and contains a microphone 295 which converts audio from the user into electrical signals transmitted through the digital communication system of FIG. 2. While shown as peripherals, it is contemplated that camera 285, speaker 290 and microphone 295 may be incorporated into the video display 255 and/or the computer system 250.

Referring back to FIG. 2, the video from the camera 285 is digitized and compressed by an encoding element using real-time compression similar to CCITT "H.261" (not shown). This encoding element produces a compressed bit stream which is combined with other bit streams within the resource allocation device 215. The resource allocation device 215 outputs a bit stream which propagates through both the terminal adapter 220 and the ISDN communication link 230. Thereafter, the bit stream is transmitted to a specific terminal.

Figure 4:
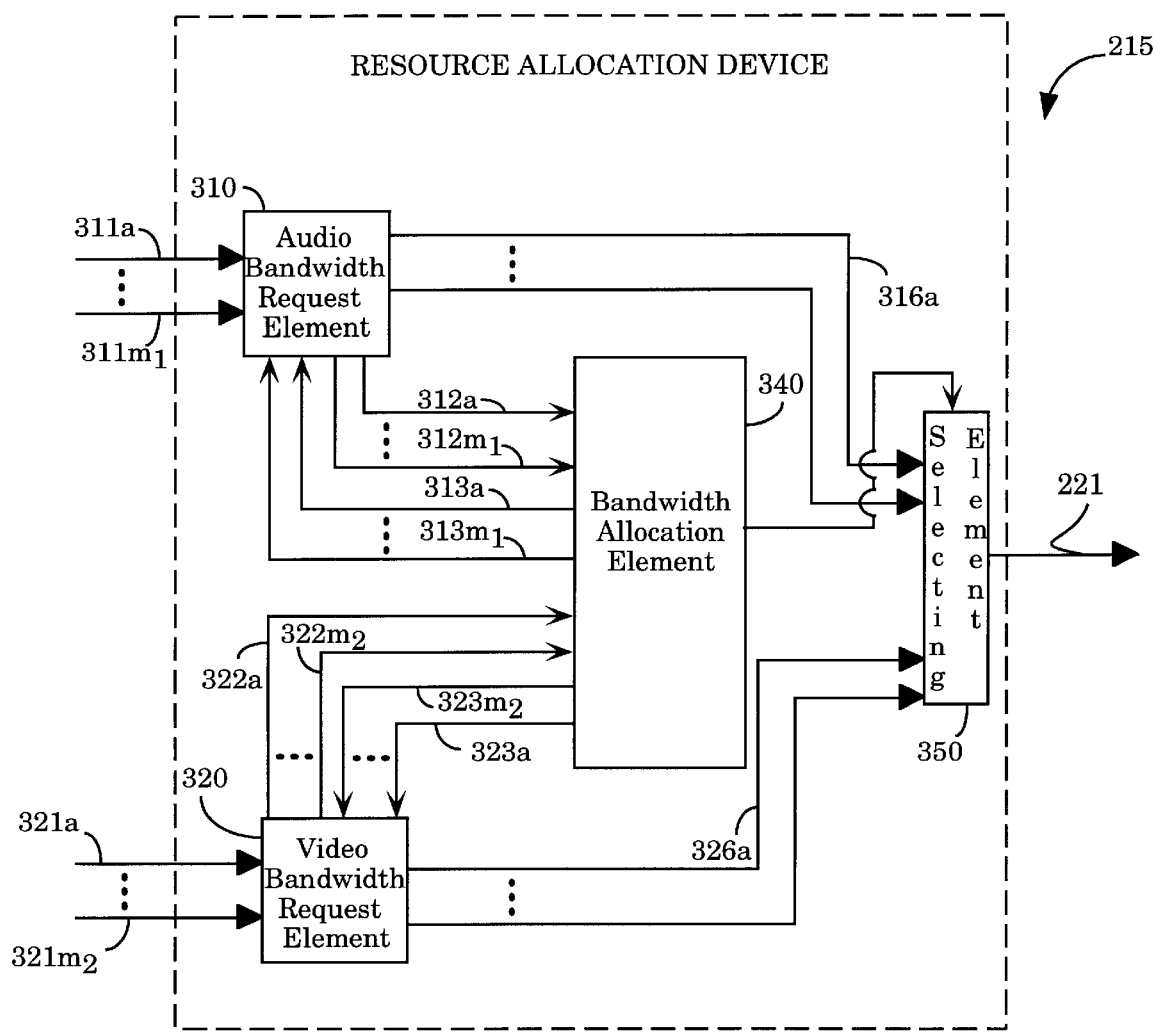
FIG. 4 is a block diagram of one embodiment of the resource allocation device including an audio bandwidth request element, a video bandwidth request element, a bandwidth allocation element and a selecting element.

Referring to FIG. 4, the resource allocation device 215 operates at least as a transmitter to selectively transmit digital information through the ISDN communication link to appropriate remote terminal(s) as shown. The resource allocation device 215 comprises (i) a bandwidth allocation element 340 for allocating bandwidth to the bandwidth request elements 300 and (ii) a selecting element 350 controlled by the bandwidth allocation element 340 to output bit streams in a certain order. The resource allocation device 215 further may comprise a plurality of bandwidth request elements including, but not limited to an audio bandwidth request element, a data bandwidth request element, a video bandwidth request element and the like, which at least translate information into information packets encoded according to a specific protocol. For simplicity, however, this illustrative embodiment includes only an audio bandwidth request element 310 and a video bandwidth request element 320.

The audio bandwidth request element 310 is coupled to at least one of the plurality of terminals through bi-directional bus lines $311a–311m_1$ ("$m_1$" being arbitrary) in order to receive uncompressed, digitized audio information from the terminals. The audio bandwidth request element 310 is further coupled to the bandwidth allocation element 340 through handshaking control lines, namely bandwidth request lines $312a–312m_1$ and bandwidth grant lines $313a–313m_1$. Thus, various bandwidth requirements of each terminal can be supported.

Figure 5:
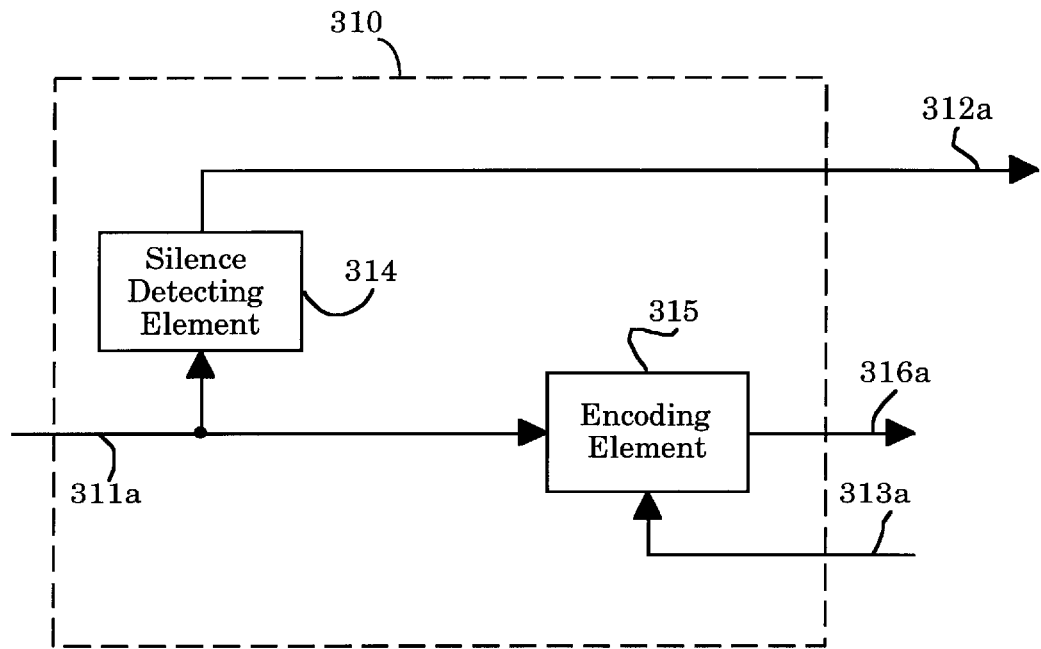
FIG. 5 is a block diagram of internal components of the audio bandwidth request element of FIG. 4 coupled to a single bi-directional bus line.

As shown in FIG. 5, the audio bandwidth request element 310 includes a silence detecting device 314 and an encoding element 315 associated with each of the plurality of terminals. As uncompressed, digitized audio information from a first terminal, for example, propagates through the bus line 311a, the silence detecting device 314 measures an audio level of the audio information to detect whether its audio activity in relation to an audio threshold level "$A_{th}$" which may be dynamically adjusted.

In the event that the audio level <$A_{th}$ indicating the absence of audio sound (normally speech), the silence detecting device 314 transmits a first allocation request packet to the bandwidth allocation element 340 through the bandwidth request line 312a requesting more bandwidth. Otherwise, the silence detecting device 314 may transmit a second allocation request packet to the bandwidth allocation element 340 requesting less bandwidth. Since audio information normally has higher priority than other types of information, it is likely that the bandwidth requested will be granted by the bandwidth allocation element 340. If such is the case, the uncompressed, digitized audio information is encoded by the encoding element 315 and output to the selecting element 350 through transmission line 316a (see FIG. 4). It is contemplated that multiple silence detecting devices having different audio threshold levels may be employed within the audio bandwidth request element 310 in order to request a wide range of bandwidths.

Referring back to FIG. 4, the video bandwidth request element 320 is coupled to the terminals through bi-directional bus lines $321a–321m_2$ and to the bandwidth allocation element 340 through bandwidth request and grant lines $322a–322m_2$ and $323a–323m_2$, respectively ("$m_2$" being arbitrary also.). For example, if the first terminal desired to transmit video to a remote terminal, the first terminal inputs the video into the video bandwidth request element 320 through the bus line 321a as shown in FIG. 6.

Figure 6:
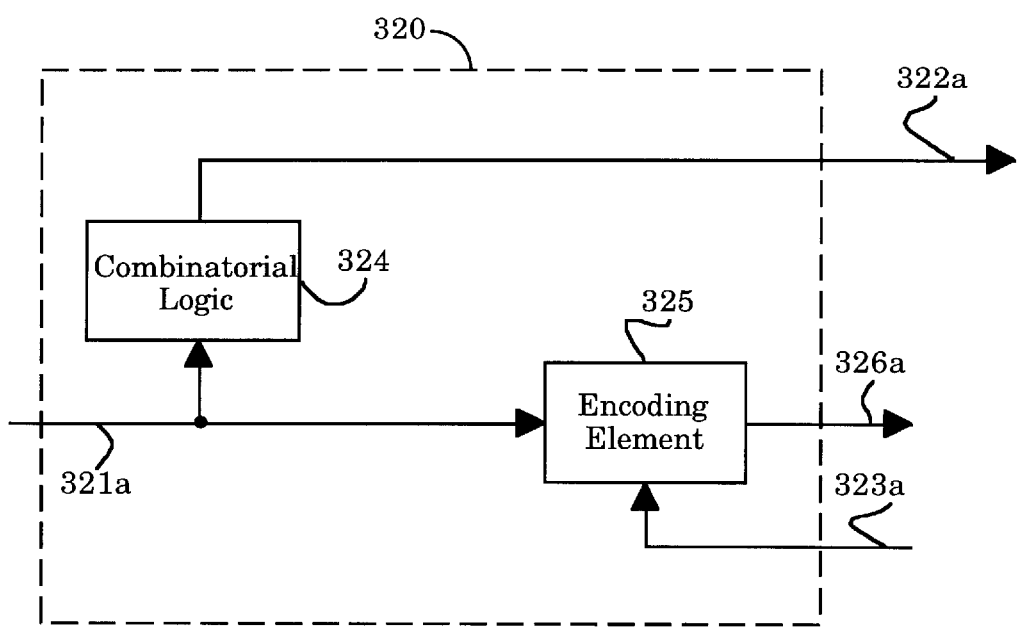
FIG. 6 is a block diagram of internal components of the video bandwidth request element of FIG. 4 coupled to a single bi-directional bus line.

Referring now to FIG. 6, the video bandwidth request element 320 includes combinatorial logic 324 to determine the amount of bandwidth required for a certain video quality and transmits an allocation request packet requesting the amount of bandwidth to the bandwidth allocation element 340 through a control line 322a. The video bandwidth request element 320 awaits an allocation grant being a packet from the bandwidth allocation element 340 via the bandwidth grant control line 323a indicating how much requested bandwidth has been allocated. The allocation grant is transmitted into an encoding element 325, executing a particular compression algorithm, associated with the particular terminal. The video bandwidth request element 320 transmits an associated compressed video bit stream via transmission line 326a to the selecting element 350 for output to the terminal adapter (see FIG. 2).

In order to avoid inequitable bandwidth allocation by encoding elements operating different compression algorithms, the video bandwidth request element 320 may require the long-term average bandwidth of each bit stream from each terminal to be identical. Moreover, in order to avoid inequitable bandwidth allocation by encoding elements operating similar compression algorithms, the quantizer level "Q" of the video may be adjusted (decreased or increased) by the bandwidth allocation element 340 in the event that more or fewer bits require transmission than requested in a previous video frame.

Figure 7A:
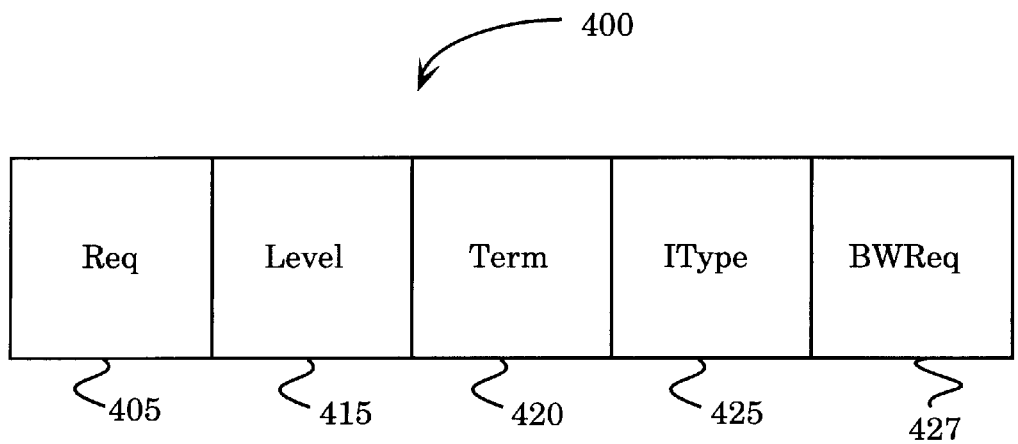
FIG. 7A is a packet representation of an allocation request.

Referring now to FIG. 7A, an illustrative embodiment of a communication protocol, namely the allocation request 400 being a packet exchanged between any one of the plurality of bandwidth request elements and the bandwidth allocation element. The allocation request 400 includes a command identifier ("REQ") 405 followed by a first plurality of parameters 410 including, but not limited to, a priority level ("Level") 415, terminal identification ("Term") 420, an information type ("Itype") 425 and a requested bandwidth ("BWReq") 427.

More specifically, the "Level" parameter 415 is a bit representation being an integer such as, for example, between "3" (highest priority) and "0" (lowest priority) inclusive, indicative of the urgency of a certain bit stream being afforded its requested bandwidth. The "Term" parameter 420 includes a unique character string representative of the terminal requesting allocation of the requested bandwidth. The "Itype" parameter 425 also includes a unique character string representing the type of information to be transferred such as, for example, audio, control data, video and other types of information. For allocation requests involving video, these requests are made once per transmitted video frame. For those requests involving audio, they are made once per audio frame, typically 30–50 milliseconds, depending on the audio algorithm used. The BWReq parameter 427 is an integer representing the amount of bandwidth requested by a particular terminal for a given information type identified by "Term" and "Itype" parameters, respectively.

Figure 7B:
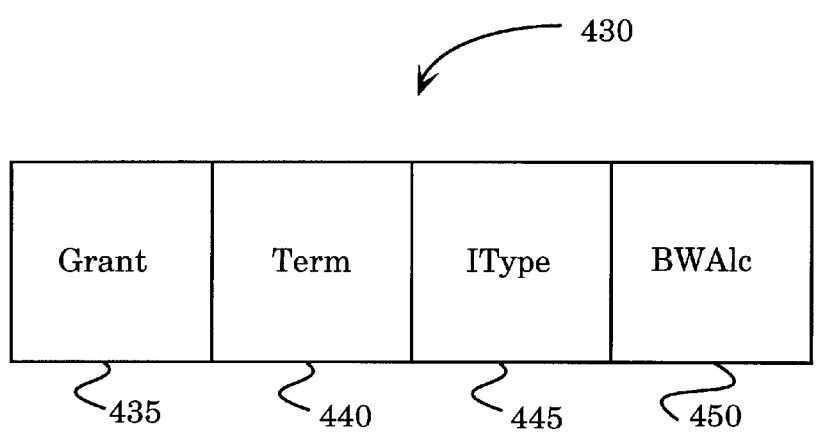
FIG. 7B is a packet representation of an allocation grant.

Referring to FIG. 7B, an illustrative embodiment of the allocation grant 430 as a packet is shown. The allocation grant 430 includes a command identifier ("GRANT") 435 followed by several parameters including "Term" 440, "Itype" 445 and allocated bandwidth ("BWAlc") 450 being an integer representing the bandwidth allocated by the resource allocation device. The BWAlc parameter 450 is used for encoding the packets of information in accordance with the allocated bandwidth. A "Level" parameter is not required because it is only necessary for determining how to allocate the bandwidth, not how it should be used once the bandwidth is allocated.

In general, the resource allocation device undergoes four operational steps to allocate bandwidth. First, the resource allocation device prioritizes the allocation requests according to their priority levels (e.g., a total of three priority levels) where requests made at a lower priority level are only satisfied when all the requests from the higher level have been granted. Next, if there is not enough available bandwidth to provide the requested bandwidth to each of the allocation requests at a particular level, the resource allocation device allocates a minimum amount of bandwidth to each information type and the remaining bandwidth is allocated based on priority, namely in the following order: audio, control data and video. As a result, a degree of fairness in the allocation of bandwidth is ensured and a consistent quality of communication remains.

Thereafter, if the minimum amounts of bandwidth cannot be provided for that particular level, the resource allocation devices grants minimum bandwidth in a prioritized manner; namely: (i) audio, (ii) control data if the bandwidth is available, and finally (iii) video if the bandwidth is still available. The last operational step is that once the demands for a particular information type or requested bandwidth cannot be met, the remaining bandwidth is divided evenly among the terminals outputting the allocation requests, except if a particular terminal has a requested bandwidth less than that afforded through equal distribution. In that case, the resource allocation device receives the requested bandwidth and the remaining bandwidth is divided equally among the other terminals.

By granting all the requests for a particular priority level before granting requests of lower priority level, the likelihood that each terminal will receive bandwidth sufficient to provide at least an acceptable quality of interaction is increased. By providing a programmable resource allocation system to prioritize bandwidth requests enables certain minimum bandwidth requirements to be granted, and therefore increases the likelihood that each conference transmission provides a basic level of interactivity.

Figure 8:
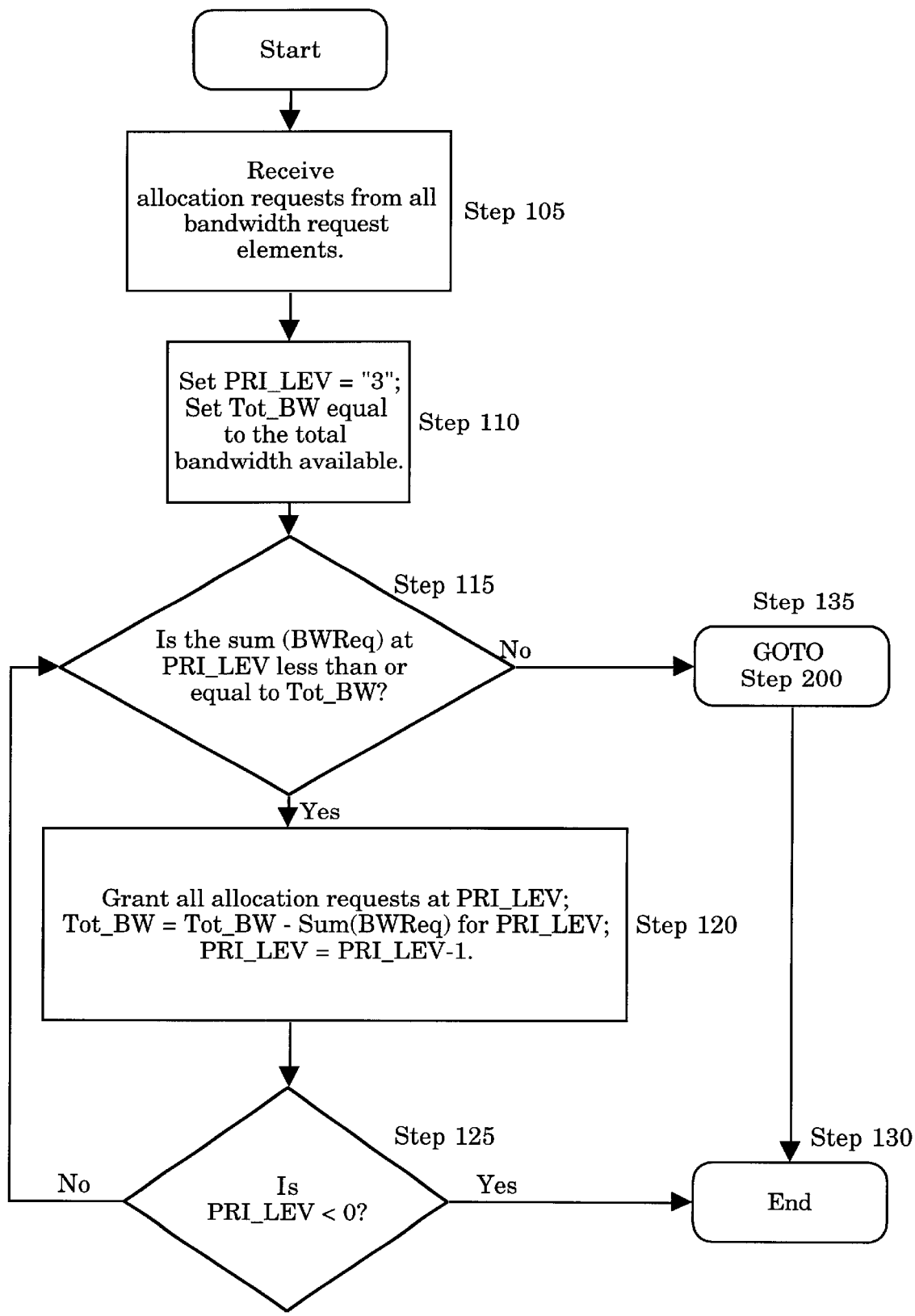
FIG. 8 is a flowchart of the process undergone by the resource allocation device in allocating bandwidth to multiple video terminals.

Referring to FIG. 8, an illustrative embodiment of the procedural steps necessary for the resource allocation device to determine how much bandwidth is to be allocated to each of terminal is shown. The resource allocation device receives as input allocation requests from at least one of the plurality of bandwidth request elements (Step 105). The allocation request includes those parameters described in FIG. 7A. Upon receiving the allocation requests, the resource allocation device determines the total bandwidth available ("Tot_BW") and stores that number into a first storage element. Initially, Tot_BW is equal to the bandwidth afforded by the basic rate interface less any overhead required by the resource allocation device, but it is adjusted based on the amount of bandwidth remaining for allocation. In addition, a second storage element is initialized and set to a chosen value in order to track its current priority level ("PRI_LEV"). PRI_LEV="3" represents that the resource allocation device is allocating bandwidth to those allocation requests having the highest priority level (Level="3") while PRI_LEV="0" represents bandwidth allocation for allocation requests having the lowest priority level (Level="0").

At step 115, the resource allocation device compares the sum of the requested bandwidths for all allocation requests made at the highest priority level (e.g., Level="3") to Tot_BW as identified by "Sum(BWReq$_3$)<Tot_BW". In the event that Sum(BWReq$_3$)<Tot_BW, the resource allocation device grants all the particular bandwidth request elements the requested bandwidth for that priority level (Step 120). Moreover, the PRI_LEV is decremented to represent a lesser priority level and Tot_BW is decreased by the requested bandwidth granted (i.e., Tot_BW=Tot_BW−Sum(BWReq$_3$)).

At step 125, the resource allocation device examines PRI_LEV to determine if a subsequent priority level is less than the numeral value assigned to the lowest priority level which is configured in this illustrative embodiment as "0". If PRI_LEV represents a non-negative integer, the process returns to Step 115. At which point, the sum of all requested bandwidths for allocation requests of priority level "2" is compared with Tot_BW which has been set to the amount of remaining bandwidth available. Otherwise, the procedure terminates (Step 130). In the event that the sum of the bandwidth requested is more than the Tot_BW (Step 135), the resource allocation device begins selective allocation as shown in FIG. 9.

Figure 9:
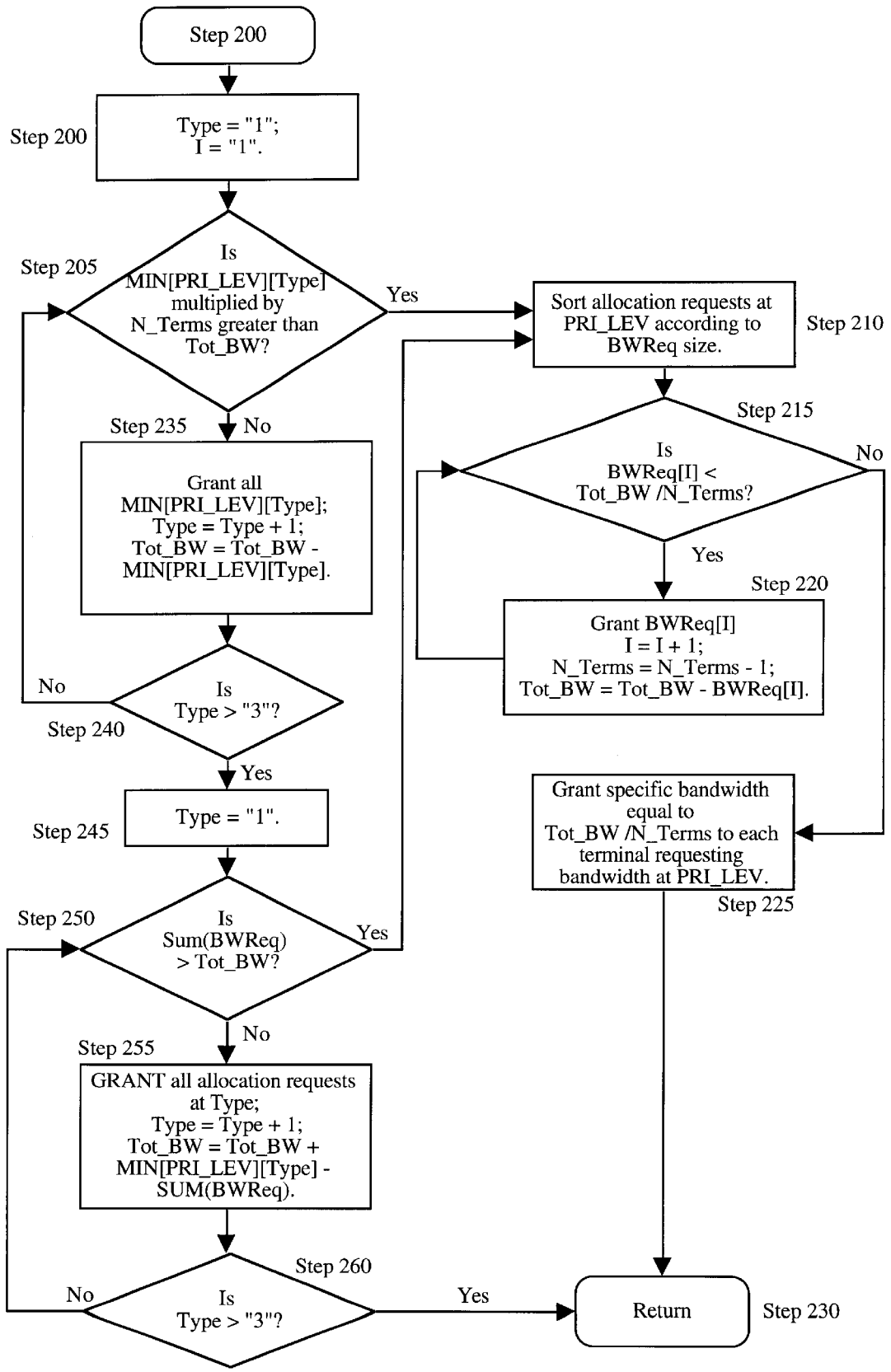
FIG. 9 is a flowchart of the selective allocation process undergone by the resource allocation device in the event that the sum of the requested bandwidths at a particular priority level is more than the total bandwidth available.

Referring now to FIG. 9, a number of representations and variables are used to illustrate the operations of the resource allocation device. For example, a recommended minimum bandwidth for each information type at a given priority level is denoted by a command array including two parameters "PRI_LEV" and "Type" represented as "MIN[PRI_LEV] [Type]". PRI_LEV is defined above while "Type" is an integer variable indicating which type of digital information is being allocated ( audio="1", control data="2", video="3" and the like). By associating these integer values to the information types, priority may be established. It is contemplated that this priority is application dependent and may be altered. If priority is not specified, the default priority (from "highest" priority to "lowest") in the preferred embodiment is as follows: (i) audio; (ii) control data; (iii) video. The integer variable "N_Terms" stores the number of terminals seeking to transmit a certain information type and the integer variable "I" operates as a counter.

Upon being called, the resource allocation device first sets "Type" equal to "1" (i.e., audio) since audio transmission has greater priority in conferencing sets "I" equal to "1" for counting purposes (Step 200). At step 205 the resource allocation device compares Tot_BW with MIN[PRI_LEV] [Type] multiplied by N_Terms, which collectively is the amount of bandwidth necessary to supply each of the terminals the recommended minimum bandwidth for audio. If the available bandwidth is not sufficient to satisfy all the requested bandwidths for audio allocation requests, the resource allocation device sorts these allocation requests by requested bandwidth size from smallest to largest, denoted by BWReq[I] where I≧1 (Step 210). Thereafter, the smallest requested bandwidth "BWReq[1]" is compared with the Tot_BW divided by N_Terms (Step 215). If BWReq[1] is less than Tot_BW divided by N_Terms, the resource allocation device grants the entire requested bandwidth, increments "I", decrements N_Terms and adjusts Tot_BW to account for the bandwidth granted (Step 220).

As shown, the operations of Step 215 are repeated with the next smallest requested bandwidth "BWReq[2]" being compared with the updated Tot_BW divided by the updated N_Terms. These operations continue one of the requested bandwidths is greater than Tot_BW divided by N_Terms. For example, if REQ[2] is greater than Tot_BW divided by N_Terms, each of the remaining terminals is granted bandwidth equal to the Tot_BW divided by N_Terms in steps 225. As a result, the resource allocation device completes its allocation and the procedure terminates (Step 230 and 130).

If, at step 205, the minimum suggested bandwidth multiplied by N_Terms is less the minimum suggested bandwidth for that information type, then the minimum suggested bandwidth is granted to each terminal (Step 235). Additionally, the variable "Type" is incremented and Tot_BW is adjusted for the bandwidth allocated. This sequence is then repeated until the available bandwidth is insufficient to satisfy the requested bandwidth or the "Type" parameter is incremented to represent an information type not supported by the resource allocation device e.g., "Type">3 in this case (Step 240).

After the resource allocation device has provided minimum bandwidths to each information type, "Type" is set back to the highest priority information type (i.e., "audio") and the sum of all the allocation requests pertaining to audio are compared with the total bandwidth available (Steps 245 and 250). If the requests are less than the available bandwidth, each of the allocation requests is granted (step 255). Moreover, "Type" is incremented and Tot_BW is updated. It should be noted that Tot_BW is updated in step 255 by adding the difference between the allocation request and the minimum suggested amount. The difference is used because the minimum will already have been allocated during step 235. If at step 250 it is determined that allocation requests for bandwidth exceed Tot_BW, the above-discussed sequence beginning at step 210 is performed where any remaining bandwidth is allocated as described above. Once it is determined that all information types supported by the terminals have been accounted, the resource allocation device terminates allocation by returning to Step 135 (Step 265).

Thus, this digital communication system described provided a superior method of supporting interactive communications over a single ISDN line. When a total demand for bandwidth becomes greater than its supply, this digital communication system first delays low priority transactions such as a large file transfers and extra highly quality image production, thus minimizing the effect noticed by the user. If the requested bandwidth continues to exceed supply, the quality of the video is further reduced (e.g., enlarging blocks or pixels forming a jagged video picture or increasing the quantizer level making coding artifacts such as blotchiness more visible). However, the audio and control data bandwidth is maintained at acceptable levels ensuring that the users will be able to understand each other, and that file information as well as cursor positioning tools will remain responsive. When substantial bandwidth is available, a higher quality video picture can be generated utilizing the full bandwidth that the ISDN line offers.

The present invention described herein may be designed using many different priority schemes. For example, it is contemplated that there may exist a mechanism which may increase a priority level of an usually low priority information type (e.g., files) in the event that the information type has been awaiting transmission for a certain duration. While the present invention has been described in terms of an illustrative embodiment, other embodiments may come to mind to those skilled in the art without departure from the spirit and scope of the present invention. The invention should, therefore, be measured in terms of the claims which follow.

What is claimed is:

1. A resource allocation device which supports real-time, interactive communications between a local source and a remote device connected via a communication link, the resource allocation device comprising:

a plurality of bandwidth request elements, wherein at least a first of said plurality of bandwidth request elements (i) receives information from the local source, (ii) generates and transmits an allocation request for a predetermined amount of a total bandwidth provided by the communication link and (iii) encodes said information according to a portion of said predetermined amount of said total bandwidth granted by a bandwidth allocation element;

said bandwidth allocation element coupled to said plurality of bandwidth request elements, said bandwidth allocation element receives said allocation request and dynamically allocates said portion of said predetermined amount of said total bandwidth; and a selecting element coupled to said bandwidth allocation element and said plurality of bandwidth request elements, said selecting element receives said encoded information from said first bandwidth request element and a control signal from said bandwidth allocation element to cause said first bandwidth request element to selectively transmit said encoded information and other encoded information provided thereto through said communication link to the remote device.

2. The resource allocation device according to claim 1, wherein said allocation request is a packet of information comprising:

a command identifier used to identify said allocation request; and a plurality of parameters including a requested bandwidth parameter representing said predetermined amount of said total bandwidth requested by said local source for a particular information type and a priority parameter indicating a degree of priority in obtaining said predetermined amount of said total bandwidth.

3. The resource allocation device according to claim 2, wherein a first terminal of the local source transmits information to said first bandwidth request element and a second terminal of the local source concurrently transmits information to said first bandwidth request element causing said first bandwidth request element to generate a first allocation request for a first predetermined amount of said total bandwidth and a second allocation request for a second predetermined amount of said total bandwidth, respectively.

4. The resource allocation device according to claim 3, wherein said bandwidth allocation element dynamically allocates said first predetermined amount of total bandwidth in compliance with said first allocation request, provided said first predetermined amount of said total bandwidth is less than a remaining bandwidth available for said communication link and said first allocation request has greater priority than said second allocation request.

5. The resource allocation device according to claim 3, wherein said bandwidth allocation element dynamically allocates an amount of bandwidth less than said first predetermined amount of total bandwidth contrary to said first allocation request, provided said first predetermined amount is greater than a remaining bandwidth available for said communication link and said first allocation request has greater priority than said second allocation request.

6. The resource allocation device according to claim 3, wherein said bandwidth allocation element dynamically allocates an amount of bandwidth less than both said first predetermined amount and said second predetermined amount, provided a collective sum of said first and second predetermined amounts is greater than a remaining bandwidth available for said communication link and said first and second allocation requests have equal priorities.

7. The resource allocation device according to claim 1, wherein said first bandwidth request element comprises an audio bandwidth request element and a video bandwidth request element.

8. The resource allocation device according to claim 7, wherein said audio bandwidth request element is coupled to said local source (i) to receive uncompressed digitized audio information, (ii) to generate a first allocation request for transmission to said bandwidth allocation element requesting a first predetermined amount of said total bandwidth, (iii) to encode said uncompressed, digitized audio information in response to a portion of said first predetermined amount of said total bandwidth allocated by said bandwidth allocation element and (iv) to transmit said encoded information to said element.

9. The resource allocation device according to claim 1, wherein said communication link is a single channel Narrow Integrated Services Digital Network ("N-ISDN").

10. The resource allocation device according to claim 1, wherein said communication link is a single channel Broad Integrated Services Digital Network ("B-ISDN").

11. A resource allocation device supporting real-time, interactive communications between at least one terminal and a remote terminal via a communication link, the resource allocation device comprising:

request means, coupled to the at least one terminal, for receiving information from the at least one terminal and for generating an allocation request requesting a predetermined amount of total bandwidth associated with the communication link;

allocation means, coupled to said request means, for receiving said allocation request from said request means and dynamically allocating at least a portion of said predetermined amount of total bandwidth for use by said request means in encoding said information; and select means for selectively transmitting said encoded information through the communication link to the remote terminal, said select means is coupled to both said request means to receive said encoded information and to said allocation means to control said select means.

12. The resource allocation device according to claim 11, wherein said allocation request is a packet of information comprising:

a command identifier used to identify said allocation request; and a plurality of parameters including a requested bandwidth parameter representing said predetermined amount of said total bandwidth requested by said request means for a particular information type and a priority parameter indicating a degree of priority in obtaining said predetermined amount of said total bandwidth.

13. The resource allocation device according to claim 12, wherein a first terminal transmits information to said request means and a second terminal concurrently transmits information to said request means causing said request means to generate a first allocation request for a first predetermined amount of said total bandwidth and a second allocation request for a second predetermined amount of said total bandwidth, respectively.

14. The resource allocation device according to claim 13, wherein said allocation means dynamically allocates said first predetermined amount of total bandwidth in compliance with said first allocation request, provided said first predetermined amount of said total bandwidth is less than a remaining bandwidth available for said communication link and said first allocation request has greater priority than said second allocation request.

15. The resource allocation device according to claim 13, wherein said allocation means dynamically allocates an amount of bandwidth less than said first predetermined amount of total bandwidth contrary to said first allocation request, provided said first predetermined amount is greater than a remaining bandwidth available for said communication link and said first allocation request has greater priority than said second allocation request.

16. The resource allocation device according to claim 13, wherein said allocation means dynamically allocates an amount of bandwidth less than both said first predetermined amount and said second predetermined amount, provided a collective sum of said first and second predetermined amounts is greater than a remaining bandwidth available for said communication link and said first and second allocation requests have equal priorities.

17. The resource allocation device according to claim 11, wherein said request means comprises an audio bandwidth request element, coupled to the at least one terminal, to (i) receive uncompressed digitized audio information, (ii) generate a first allocation request for transmission to said allocation means requesting a first predetermined amount of said total bandwidth, (iii) encode said uncompressed, digitized audio information in response to a portion of said first predetermined amount of said total bandwidth allocated by said allocation means and (iv) transmit said encoded information to said select means.

18. The resource allocation device according to claim 11, wherein said communication link is a single channel Narrow Integrated Services Digital Network ("N-ISDN").

19. The resource allocation device according to claim 11, wherein said communication link is a single channel Broad Integrated Services Digital Network ("B-ISDN").

20. A communication system supporting real-time, interactive communications with a remote terminal, comprising:

a plurality of terminals, wherein each of said plurality of terminals transmits information through a corresponding information bus line;

a resource allocation device coupled to each of said plurality of terminals through said corresponding plurality of information bus lines, said resource allocation device including a plurality bandwidth request elements, wherein at least a first of said plurality of bandwidth request elements (i) receives information from one of the plurality of terminals, (ii) generates and transmits an allocation request for a predetermined amount of a total bandwidth provided by a communication link and (iii) encodes said information into an information packet according to a portion of said predetermined amount of said total bandwidth granted by a bandwidth allocation element, said bandwidth allocation element coupled to said plurality of bandwidth request elements, said bandwidth allocation element receives said allocation request and dynamically allocates said portion of said predetermined amount of said total bandwidth, and a selecting element coupled to said bandwidth allocation element and said plurality of bandwidth request elements, said selecting element receives (i) information packets from said first bandwidth request element and from other bandwidth request elements of said plurality of bandwidth request elements and (ii) a control signal from said bandwidth allocation element to cause said first bandwidth request element to selectively transmit said information packets through said communication link; and said communication link coupled to said resource allocation device, said communication link transmits said information packets to at least said remote terminal remotely located from said plurality of terminals.

21. The communication system according to claim 20, wherein said allocation request is a packet of information comprising:

a command identifier to identify said allocation request; and a plurality of parameters including a requested bandwidth parameter representing said predetermined amount of said total bandwidth requested by one of said plurality of terminals for a particular information type and a priority parameter indicating a degree of priority in obtaining said predetermined amount of said total bandwidth.

22. The communication system according to claim 21, wherein a first terminal transmits information into said bandwidth request element and a second terminal concurrently transmits information into said bandwidth request element causing said bandwidth request element to generate a first allocation request for a first predetermined amount of said total bandwidth and a second allocation request for a second predetermined amount of said total bandwidth, respectively.

23. The communication system according to claim 22, wherein said bandwidth allocation element dynamically allocates said first predetermined amount of total bandwidth in compliance with said first allocation request, provided said first predetermined amount of said total bandwidth is less than a remaining bandwidth available for said communication link and said first allocation request has greater priority than said second allocation request.

24. The communication system according to claim 22, wherein said bandwidth allocation element dynamically allocates an amount of bandwidth less than said first predetermined amount of total bandwidth contrary to said first allocation request, provided said first predetermined amount is greater than a remaining bandwidth available for said communication link and said first allocation request has greater priority than said second allocation request.

25. The communication system according to claim 22, wherein said bandwidth allocation element dynamically allocates an amount of bandwidth less than both said first predetermined amount and said second predetermined amount, provided a collective sum of said first and second predetermined amounts is greater than a remaining bandwidth available for said communication link and said first and second allocation requests have equal priorities.

26. The communication system according to claim 20, wherein said bandwidth request element comprises an audio bandwidth request element and a video bandwidth request element.

27. The communication system according to claim 26, wherein said audio bandwidth request element is coupled to at least one of said plurality of terminals to receive uncompressed digitized audio information from said at least one terminal, to generate a first allocation request for transmission to said bandwidth allocation element requesting a first predetermined amount of said total bandwidth, to encode said uncompressed, digitized audio information in response to a portion of said first predetermined amount of said total bandwidth allocated by said bandwidth allocation element and to transmit said encoded information to said element.

28. The communication system according to claim 20, wherein said communication link is a single channel Narrow Integrated Services Digital Network ("N-ISDN").

29. The communication system according to claim 20, wherein said communication link is a single channel Broad Integrated Services Digital Network ("B-ISDN").

30. A communication system supporting transmissions of information in real-time, said communication system comprising:

first terminal means for transmitting uncompressed, digital information through a plurality of information bus lines;

bus means for transmitting information packets from said first terminal means to a second terminal means remotely located from said first terminal means; and resource allocation means for dynamically allocating a predetermined amount of bandwidth pertaining to said bus means and for encoding said uncompressed, digital information into said information packets constructed according to said predetermined amount of bandwidth for transmission through said bus means, said resource allocation means being coupled between said terminal means and said bus means.

31. The communication system according to claim 30, wherein said resource allocation device comprises:

request means, being coupled to said first terminal means, for receiving information from said first terminal means and for generating an allocation request requesting a predetermined amount of total bandwidth associated with said bus means;

allocation means, being coupled to said request means, for receiving said allocation request from said request means and dynamically allocating at least a portion of said predetermined amount of total bandwidth for use by said request means in encoding said information; and select means for selectively transmitting said encoded information through said bus means to a remote terminal, said select means being coupled to both said request means to receive said encoded information and said allocation means to control said select means.

32. The communication system according to claim 31, wherein said bus means is a single channel Narrow Integrated Services Digital Network ("N-ISDN").

33. The communication system according to claim 31, wherein said bus means is a single channel Broad Integrated Services Digital Network ("B-ISDN").

34. A method for conducting multiple video conferencing sessions between at least a first terminal and a second terminal over a communication link having a total bandwidth, the method comprising the steps of:

receiving a plurality of allocation requests, wherein each of said plurality of allocation requests includes a requested bandwidth parameter representing a predetermined amount of said total bandwidth requested to transmit information to said second terminal and a priority parameter indicating urgency in receiving a predetermined amount of bandwidth;

comparing an amount of bandwidth requested by a first subset of said plurality of allocation requests having a first priority level to said total bandwidth for said communication link;

dynamically allocating at least a selected amount of said total bandwidth;

encoding said information according to said selected amount of said total bandwidth; and selectively transmitting said encoded information through said communication link to said second terminal.

35. The method according to claim 34 further comprising the steps of:

receiving information from at least said first terminal; and providing at least one allocation request for a predetermined amount of said total bandwidth associated with said communication link.

36. The method according to claim 35, wherein said predetermined amount is less than or equal to said selected amount.

37. The method according to claim 35, wherein said predetermined amount is greater than said selected amount.

38. The method according to claim 34, wherein if said total bandwidth is greater than or equal to said amount of bandwidth requested by said first subset, said allocating step comprising the steps of:

allocating said selected amount of said total bandwidth being equal to said predetermined amount of said total bandwidth requested by said first subset, and calculating a remaining bandwidth being said bandwidth requested by said first subset subtracted from said total bandwidth, said remaining bandwidth being used for further calculation for a second subset of said plurality of allocation requests having a second priority level.

39. The method according to claim 38, wherein if said total bandwidth is less than said amount of bandwidth requested by said first subset, said allocating step comprises the step of:

determining whether a minimum amount of bandwidth needed by each allocation request of said first subset is greater than said total bandwidth, wherein if said minimum amount of bandwidth needed by each allocation request of said first subset is greater than said total bandwidth sorting bandwidth request sizes of said first subset of said plurality of allocation requests, and allocating an equal share of said total bandwidth to each allocation request of said first subset in which said equal share of said total bandwidth is equal to said selected amount of said total bandwidth, and alternatively providing at least said minimum amount of bandwidth to each allocation request of said first subset if said minimum amount of bandwidth needed by each of said first subset is greater than said total bandwidth, said minimum amount of bandwidth being said selected amount of said total bandwidth.

\* \* \* \* \*